US006719909B2

(12) United States Patent
Ohkawa

(10) Patent No.: US 6,719,909 B2
(45) Date of Patent: Apr. 13, 2004

(54) BAND GAP PLASMA MASS FILTER

(75) Inventor: Tihiro Ohkawa, La Jolla, CA (US)

(73) Assignee: Archimedes Technology Group, Inc., San Diego, CA (US)

( * ) Notice: Subject to any disclaimer, the term of this patent is extended or adjusted under 35 U.S.C. 154(b) by 119 days.

(21) Appl. No.: 10/114,900

(22) Filed: Apr. 2, 2002

(65) Prior Publication Data

US 2003/0183567 A1 Oct. 2, 2003

(51) Int. Cl.[7] .................... B03C 1/00; B01D 21/26

(52) U.S. Cl. .................... 210/695; 210/748; 210/787; 210/222; 210/243; 210/512.1; 422/186.01; 422/186.02; 209/12.1; 209/727; 204/55; 96/1; 96/2; 96/3; 95/28

(58) Field of Search .................... 210/695, 748, 210/787, 222, 243, 512.1; 422/186.01, 186.02; 209/12.1, 727; 204/55; 96/1, 2, 3; 95/28

(56) References Cited

U.S. PATENT DOCUMENTS 3,722,677 A 3/1973 Lehnert
5,616,919 A 4/1997 Broadbent
6,096,220 A 8/2000 Ohkawa
6,204,510 B1 3/2001 Ohkawa
6,251,281 B1 6/2001 Ohkawa
6,251,282 B1 6/2001 Putvinski
6,258,216 B1 7/2001 Ohkawa

*Primary Examiner*—David A. Reifsnyder

(57) ABSTRACT

A device and method for selectively establishing predetermined orbits, relative to an axis, for ions of a first mass/charge ratio ($m_1$), requires crossing an electric field with a substantially uniform magnetic field (E×B). The magnetic field is oriented along the axis and the electric field has both a d.c. voltage component ($\nabla\Phi_0$) and an a.c. voltage component ($\nabla\Phi_1$). In operation, voltage $\Phi_0$ is fixed to place the ions $m_1$ on confined orbits around the axis when $\Phi_1$ is zero. On the other hand, when $\Phi_1$ is tuned to a predetermined value, the ions $m_1$ are ejected away from the axis. With E×B established in a chamber, the ions $m_1$ will pass through the chamber when on confined orbits ($\Phi_1$=0), and they will be ejected into the wall of the chamber when on unconfined orbits ($\Phi_1$=predetermined value).

20 Claims, 1 Drawing Sheet

BAND GAP PLASMA MASS FILTER

FIELD OF THE INVENTION

The present invention pertains generally to devices and methods for processing multi-species plasmas. More particularly, the present invention pertains to devices and methods for controlling the orbits of particular ions in a plasma by manipulating crossed electric and magnetic fields (E×B). The present invention is particularly, but not exclusively, useful for tuning an a.c. voltage component of the electric field, in crossed electric and magnetic fields; to control the orbits of ions having a particular mass/charge ratio; and to thereby separate these ions from a multi-species plasma in a predictable way.

BACKGROUND OF THE INVENTION

A plasma mass filter for separating ions of a multi-species plasma has been disclosed and claimed in U.S. Pat. No. 6,096,220 which issued to Ohkawa (hereinafter the Ohkawa Patent), and which is assigned to the same assignee as the present invention. To the extent it is applicable, the Ohkawa Patent is incorporated herein by reference, in its entirety. In brief, the Ohkawa Patent discloses a plasma mass filter which includes a cylindrical chamber that is configured with axially oriented, crossed electric and magnetic fields (E×B). More specifically, the electric field, E, has a positive value wherein the voltage at the center ($V_{ctr}$) is positive and decreases to zero at the wall of the chamber. Further, the electric field (E) has a parabolic voltage distribution radially and the magnetic field (B) is constant axially. Thus, E and B are established to set a cut-off mass, $M_c$, which is defined as:

$$M_c = zea^2(B)^2/8V_{ctr}$$

where "a" is the distance between the axis and the wall of the chamber and "e" is the elementary charge, and "z" is the charge number of the ion.

In the operation of the plasma mass filter disclosed in the Ohkawa Patent, the crossed electric and magnetic fields (E×B) place ions on either "unconfined" or "confined" orbits, depending on the relative values of the mass/charge ratio of the ion "m," and the cut-off mass $M_c$, as it is established for the filter. Specifically, when "m" is greater than $M_c$, the ion will be placed on an unconfined orbit. The result then is that the heavy ion, (i.e. $m>M_c$), is ejected from the axis on its unconfined orbit and into collision with the wall of the chamber. On the other hand, in these crossed electric and magnetic fields, when an ion has a mass/charge ratio "m" that is less than $M_c$, the plasma mass filter causes the light ion (i.e. $m<M_c$) to have a confined orbit. In this latter case, the result is that the light ion will exit the chamber on its confined orbit. The situation changes, however, if the electric field has an a.c. voltage component.

Consider crossed electric and magnetic fields (E×B) wherein the electric field has both a d.c. voltage component ($\nabla\Phi_0$) and an a.c. voltage component ($\nabla\Phi_1$). A charged particle with a charge/mass ratio "m" (i.e. an ion) will have a cyclotron frequency in these crossed electric and magnetic fields which can be expressed as $\Omega=zeB/m$, wherein "e" is the elementary charge of an electron and "z" is the charge number. Further, a derivation of the equations of motion for ions in a crossed electric and magnetic field, without collisions, yields an expression in the form of a Hill's equation; namely $$d^2/dt^2 s + [\Omega/4 - \lambda]s = 0.$$

In this case:

$$\lambda = 2eV(t)/ma^2$$

where V(t) is the applied voltage, as a function of time, and "a" is the distance between the axis and the wall of the chamber. If λ is sinusoidal, with a frequency, ω; namely $$\lambda = \lambda_0 + \lambda_1 \cos \omega t$$

the Hill's equation shown above is transformed into the form of a Mathieu's equation; namely $$[1/4] d^2/dt^2 s = [\alpha - 4\beta \cos 2\tau]s = 0$$

where $$\tau = \omega t/2$$

$$\alpha = [\Omega^2/4 - \lambda_0]/\omega^2$$

$$\beta = \lambda_1/[4\omega^2].$$

For small values of β the following expressions will define boundaries that differentiate between operational regimes for confined and unconfined orbits. These expressions are:

$$4\alpha_0 = -2^5\beta^2 + 2^5 7\beta^4$$

$$4\alpha_1 = 1 \pm 8\beta - 8\beta^2$$

$$4\alpha_2 = 4 + 80/3\ \beta^2$$

The consequence of the above is that when the electric field, E, of crossed electric and magnetic fields is provided with an a.c. voltage component ($\nabla\Phi_1$) the a.c. voltage component can be tuned to place selected ions on an unconfined orbit. This will be so, even though the ions would have otherwise passed through the chamber on confined orbits in the absence of an a.c. voltage component. Further, due to the mass dependence of the above equations, ions of a predetermined mass/charge ratio "m" can be selectively targeted for the change from confined orbits to unconfined orbits.

An example of a desirable consequence that can result from the above disclosed phenomenon is provided by the element Strontium (Sr). It happens that the doubly ionized ion species of this element, $Sr^{++}90$, has the equivalent mass number of 45 (i.e. m=45). With this in mind, consider a plasma mass filter that has been configured with crossed electric and magnetic fields (E×B) having an established cut-off mass, $M_c=75$, but with no a.c. voltage component ($\nabla\Phi_1$) for the electric field. Under these circumstances (i.e. $m<M_c$) the $Sr^{++}90$ (with m=45) will be placed on confined orbits and allowed to exit the filter. This, however, may be an undesirable result. Thus, in accordance with the mathematical calculations discussed above, an a.c. voltage component ($\nabla\Phi_1$) that is introduced into the electric field can be tuned to take out the $Sr^{++}90$ by placing these ions on unconfined orbits. In this particular example, it can be mathematically shown that the $Sr^{++}90$ will be taken out of the plasma (i.e. ejected into the wall of the plasma chamber) if the a.c. voltage component ($\nabla\Phi_1$) is tuned with an r.f. frequency ω=0.63.Ω.

In light of the above, it is an object of the present invention to provide a band gap plasma filter that can effectively change the characteristic orbit of selected ions from confined to unconfined orbits. Yet another object of the present invention is to provide a band gap plasma filter with crossed electric and magnetic fields that place selected ions of a multi-species plasma on unconfined orbits, while ions of higher and lower mass/charge ratios can be placed on confined orbits. Still another object of the present invention is to provide a band gap plasma filter that is easy to manufacture, is simple to use, and is cost effective.

SUMMARY OF THE PREFERRED EMBODIMENTS

A band gap plasma filter for selectively controlling ions of a multi-species plasma having a predetermined mass/charge ratio ($m_1$) includes a plasma chamber and a means for generating crossed electric and magnetic fields (E×B) in the chamber. More specifically, the chamber itself is hollow and is substantially cylindrical-shaped. As such, the chamber defines an axis and is surrounded by a wall.

In order to generate the crossed electric and magnetic fields (E×B) in the chamber, magnetic coils are mounted on the chamber wall, and electrodes are positioned at the end(s) of the chamber. Specifically, the magnetic coils establish a substantially uniform magnetic field (B) that is oriented along the axis of the chamber. The electrodes, however, create an electric field (E) with an orientation that is in a substantially radial direction relative to the axis. Importantly, as envisioned for the present invention, the electric field has the capability of having both a d.c. voltage component ($\nabla\Phi_0$) and an a.c. voltage component ($\nabla\Phi_1$) (i.e. $E=\nabla(\Phi_0+\Phi_1)$). Specifically, the d.c. component of the voltage ($\nabla\Phi_0$) is characterized by a constant positive voltage, $V_{ctr}$, along the axis of the chamber, and has a parabolic dependence on radius with a substantially zero voltage at the wall of the chamber. On the other hand, the a.c. component of the voltage ($\nabla\Phi_1$) will be sinusoidal and is tunable with an r.f. frequency, ω.

In the operation of the band gap filter of the present invention, the d.c. voltage component ($\nabla\Phi_0$) of the electric field, E, can be fixed as discussed above, to establish a cut-off mass, $M_c=zea^2(B)^2/8V_{ctr}$. When $m_1<M_c$, and the a.c. voltage component ($\nabla\Phi_1$) of the electric field, E, is substantially zero, the d.c. voltage component ($\nabla\Phi_0$) will place the ions $m_1$ on confined orbits in the chamber. In this case the band gap filter of the present invention operates substantially the same as the Plasma Mass Filter disclosed and claimed in the Ohkawa Patent. Accordingly, the ions $m_1$ will pass through the chamber on their confined orbits. The introduction of a predetermined a.c. voltage component ($\nabla\Phi_1$) into the electric field, E, however, will change this.

In addition to the components which generate the crossed electric and magnetic fields (E×B), the band gap filter of the present invention includes a tuner for tuning the amplitude and frequency, ω, of the a.c. component ($\nabla\Phi_1$) of the voltage. Specifically, for the example discussed above wherein $m_1<M_c$, the a.c. voltage component ($\nabla\Phi_1$) can be tuned so that the ions $m_1$ will be placed on unconfined orbits in the chamber, rather than being placed on the confined orbits they would otherwise follow when there is no a.c. voltage component ($\nabla\Phi_1$). More specifically, this is possible by selectively tuning the a.c. voltage component ($\nabla\Phi_1$) with a radio frequency, ω, according to values of α and β, wherein $$\alpha=[\Omega^2/4-\lambda_0]/\omega^2$$

$$\beta=\lambda_1/[4\omega^2].$$

The consequence of the above is that when placed on unconfined orbits, the ions $m_1$ will move away from the axis of the chamber and be ejected into collision with the wall. Thus, rather than passing through the chamber on confined orbits, the ions $m_1$ can be selectively prevented from passing through the chamber. For a multi-species plasma that includes both the ions $m_1$, as well as ions of a second mass/charge ratio ($m_2$), the band gap filter of the present invention can selectively prevent these ions (either $m_1$, or $m_2$, or both) from passing through the chamber.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
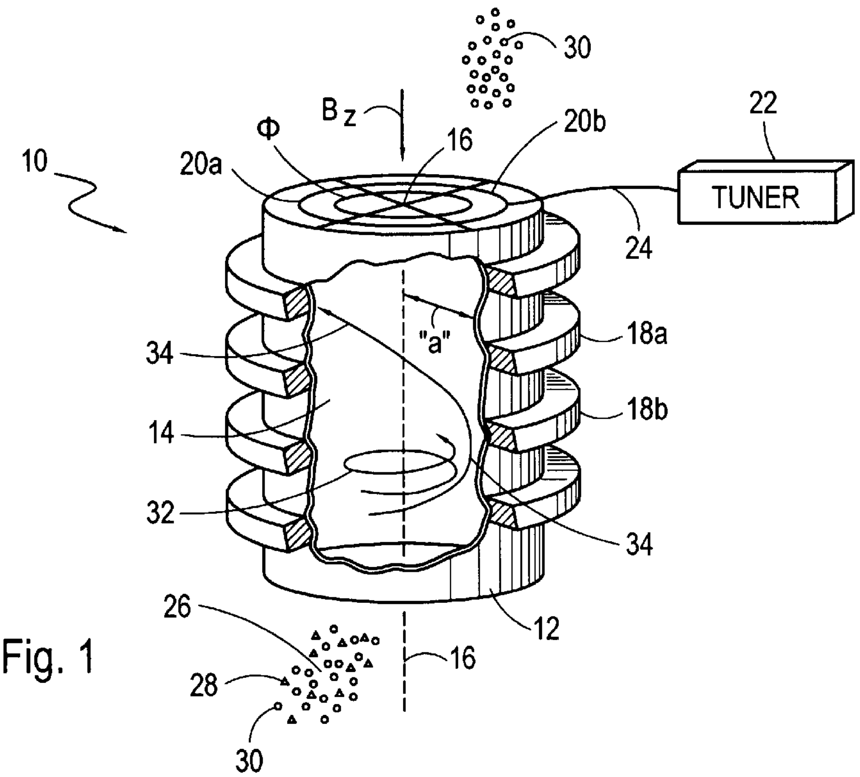
FIG. 1 is a perspective view of a band gap filter in accordance with the present invention.

Referring initially to FIG. 1, a band gap plasma mass filter in accordance with the present invention is shown, and is generally designated 10. As shown, the filter 10 includes a cylindrical wall 12 which surrounds a chamber 14, and which defines an axis 16. Further, the filter 10 includes a plurality of magnetic coils 18, of which the coils 18*a* and 18*b* are exemplary. In particular, the magnetic coils 18 are used for generating a substantially uniform magnetic field, $B_z$, that is oriented substantially parallel to the axis 16. In addition to the magnetic field, B, the filter 10 also includes an electrode(s) 20 for generating an electric field, E. Like the coils 18*a* and 18*b*, the ring electrodes 20*a* and 20*b* are also only exemplary. Importantly, the electric field, E, is oriented in a direction that is substantially radial relative to the axis 16 and is, therefore, crossed with the magnetic field.

An important component of the filter 10 of the present invention is a tuner 22. As shown in FIG. 1, this tuner 22 is electronically connected to the electrodes 20*a* and 20*b* via a connection 24. In accordance with the present invention, the tuner 22 is used to establish the radial electric field, E (Φ), with both a d.c. voltage component ($\nabla\Phi_0$) and an a.c. voltage component ($\nabla\Phi_1$) (i.e. $E(\Phi)=\nabla(\Phi_0+\Phi_1)$). Specifically, the d.c. component of voltage ($\nabla\Phi_0$) is characterized by a constant positive voltage, $V_{ctr}$, along the axis 16 of the chamber 14, and it has a substantially zero voltage at the wall 12 of the chamber 14. On the other hand, the a.c. voltage component ($\nabla\Phi_1$) will be sinusoidal and will be tunable with an r.f. frequency, ω.

In general, the functionality of the filter 10 is perhaps best illustrated and discussed with reference to FIG. 1. There, it will be seen that a multi-species plasma 26, which includes ions 28 of relatively low mass/charge ratio ($m_1$) as well as ions 30 of relatively high mass/charge ratio ($m_2$), is introduced into the chamber 14 of filter 10. This introduction of the plasma 26 can be done in any manner well known in the pertinent art, such as by the use of a plasma torch (not shown). Once inside the chamber 14, depending on the value of the a.c. voltage component ($\nabla\Phi_1$) for the electric field ($E(\Phi)=\nabla(\Phi_0+\Phi_1)$), the ions $m_1$ and $m_2$ will follow either a confined orbit 32, or an unconfined orbit 34. In order to determine which orbit is to be followed (32 or 34), the value of the electric field's a.c. voltage component ($\nabla\Phi_1$) can be selectively tuned to the specific mass/charge ratio of the ion(s) that is(are) to be affected ($m_1$ or $m_2$).

Figure 2:
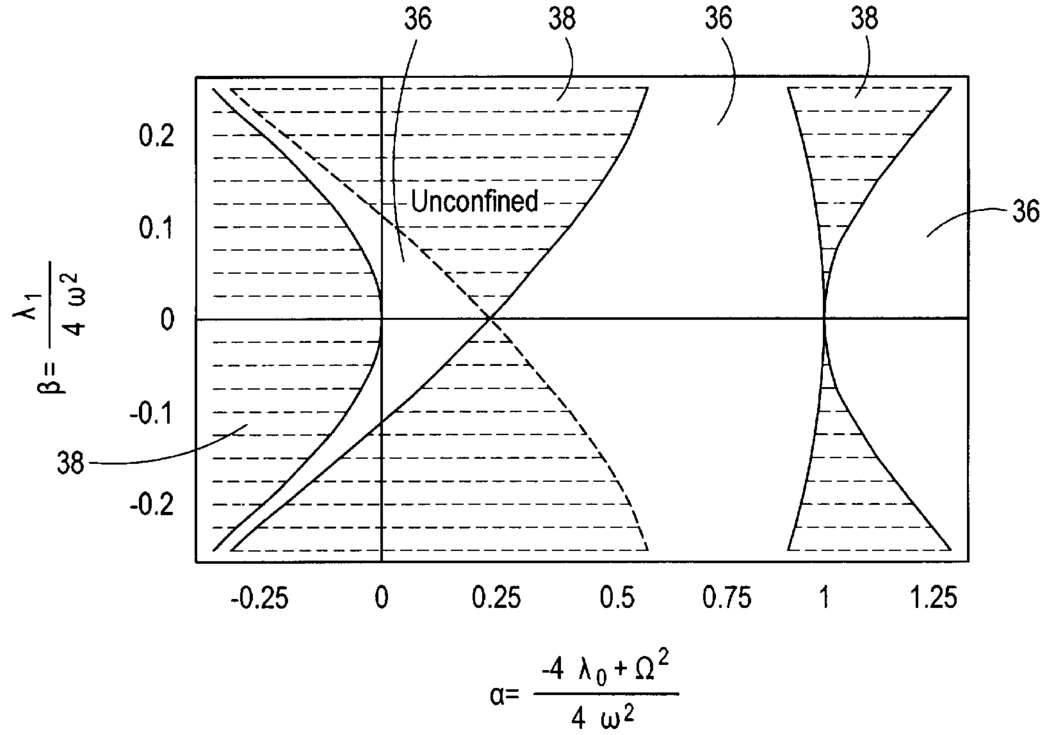
FIG. 2 is a chart showing the relationships between α and β showing regimes (regions) wherein the a.c. voltage component ($\nabla\Phi_1$) of an electric field, E, places selected ions on either confined or unconfined orbits while they are in the chamber of the band gap filter.

The tuning of the a.c. voltage component ($\nabla\Phi_1$) for the electric field ($E(\Phi)$) will be best appreciated with reference to FIG. 2. Recall from the discussion above that, in the environment of a plasma mass filter (including the environment of the band gap plasma mass filter 10 of the present invention) an ion's equations of motion can be mathematically shown to be in the form of Mathieu's equation, namely $$[1/4]d^2/dt^2s=[\alpha-4\beta\cos 2\tau]s=0$$

where $$\tau=\omega t/2$$

$$\alpha=[\Omega^2/4-\lambda_0]/\omega^2$$

$$\beta=\lambda_1/[4\omega^2].$$

As also discussed above, for small values of $\beta$, the following expressions define boundaries that differentiate between operational regimes for confined orbits 32, and unconfined orbits 34. Specifically, these expressions are:

$$4\alpha_0=-2^5\beta^2+2^57\beta^4$$

$$4\alpha_1=1\pm8\beta-8\beta^2$$

$$4\alpha_2=4+80/3\ \beta^2$$

In FIG. 2, the above expressions have been plotted as boundaries in a chart which shows the relationships between $\alpha$ and $\beta$. Specifically, these boundaries define regions 36 wherein an ion ($m_1$ or $m_2$) will be placed on a confined orbit 32. The chart in FIG. 2 also shows regions 38 wherein an ion ($m_1$ or $m_2$) will be placed on an unconfined orbit 34. For purposes of the present invention, it is important that values for both $\alpha$ and $\beta$, in either of the regions 36 and 38, are determined by the particular mass/charge ratio "m" of the selected ion, and the r.f. frequency, $\omega$, of the electric field's a.c. voltage component ($\nabla\Phi_1$). Specifically, the "$\alpha$" term includes $\lambda_0$ which is taken from $\lambda=\lambda_0+\lambda_1\cos\omega t=2eV(t)/ma^2$, and it includes the cyclotron frequency $\Omega$ of the ion of mass/charge ratio "m" (by definition: $\Omega=eB/m$) where $\nabla(t)=\Phi_0+\Phi_1(t)$. Further, the "$\beta$" term includes $\lambda_1$ which is also taken from $\lambda=\lambda_0+\lambda_1\cos\omega t=2eV(t)/ma^2$.

In operation, the d.c. voltage component of the electric field ($\nabla\Phi_0$) is set. Generally, this can be done to establish a cut-off mass, $M_c$. As defined above, this cut-off mass is expressed as:

$$M_c=zea^2(B)^2/8V_{ctr}.$$

The value of $M_c$ then leads directly to the value for the d.c. voltage component of the electric field ($\nabla\Phi_0$). Without more, ions of mass/charge ratio "m" greater than $M_c$ ($m>M^c$) will be placed on unconfined orbits 34 which will cause them to collide with the wall 12 of the chamber 14 for subsequent collection. On the other hand, ions of mass/charge ratio "m" less than $M_c$ ($m<M_c$) will be placed on confined orbits 32 which will cause them to transit through the chamber 14.

As suggested above, in some instances it may be desirable to place ions that have a mass/charge ratio "m" less than $M_c$ ($m<M_c$) on unconfined orbits 34. In accordance with the present invention, this can be done by tuning the electric field's a.c. voltage component ($\nabla\Phi_1$). Once the ion to be affected by the electric field's a.c. voltage component ($\nabla\Phi_1$) has been identified, its cyclotron frequency can be determined: $\Omega=eB/m$. Further, with the expressions $\lambda=2eV(t)/ma^2$ and $\lambda=\lambda_0+\lambda_1\cos\omega t$, values for the variables $\lambda_0$, $\lambda_1$ and $\omega$ can be established. Specifically, the variables $\lambda_0$, $\lambda_1$ and $\omega$ are established to give "$\alpha$" and "$\beta$" terms that will operationally place the particular ion in a region 38 of FIG. 2. The consequence here is that the ion will be placed on an unconfined orbit 34 and, instead of transiting the chamber 14, will be ejected into the wall 12 of the chamber 14. It is to be noted that when the plasma that is introduced into the chamber 14 is a multi-species plasma 26 that includes both light ions 28 having a first mass/charge ratio ($m_1$) and heavy ions 30 having a second mass/charge ratio ($m_2$), the ions 28 or 30 can be selectively isolated by the a.c. component of voltage ($\nabla\Phi_1$). This will be so regardless whether the first mass/charge ratio ($m_1$) is greater than the second mass/charge ratio ($m_2$) or is less than the second mass/charge ratio ($m_2$).

While the particular Band Gap Plasma Mass Filter as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A band gap plasma filter for selectively passing ions of a first mass/charge ratio ($m_1$) therethrough, wherein $m_1$ is less than a predetermined cut off mass, $M_c$, said filter comprising:

a means for introducing a plasma, including said ions $m_1$, into a hollow, substantially cylindrical-shaped chamber, said chamber defining an axis and being surrounded by a wall;

a magnetic means for establishing a substantially uniform magnetic field (B), said magnetic field being oriented along said axis in said chamber;

a means for creating an electric field (E), wherein said electric field is oriented in a substantially radial direction relative to said axis to cross with said magnetic field (E×B), and wherein said electric field has a d.c. voltage component ($\nabla\Phi_0$) and an a.c. voltage component ($\nabla\Phi_1$) ($E=\nabla(\Phi_0+\Phi_1)$;

a means for fixing said d.c. voltage component ($\nabla\Phi_0$) to confine said ions $m_1$ for passage through said chamber and subsequent exit therefrom when said a.c. voltage component ($\nabla\Phi_1$) is substantially zero; and a means for tuning said a.c. voltage component ($\nabla\Phi_1$) to eject said ions $m_1$ from said chamber and into collision with said wall thereof to prevent passage of said ions $m_1$ through said chamber.

2. A filter as recited in claim 1 wherein said plasma is a multi-species plasma and includes ions of a second mass/charge ratio ($m_2$).

3. A filter as recited in claim 2 wherein said first mass/charge ratio ($m_1$) is greater than said second mass/charge ratio ($m_2$).

4. A filter as recited in claim 2 wherein said first mass/charge ratio ($m_1$) is less than said second mass/charge ratio ($m_2$).

5. A filter as recited in claim 1 wherein said cut off mass, $M_c$, is determined by the expression:

$$M_c=zea^2(B)^2/8V_{ctr}$$

where "e" is the elementary charge, "z" is the charge number, "a" is the distance between the axis and the wall of the chamber, and the voltage has a positive value ($V_{ctr}$) along the axis, which decreases parabolically to zero at the wall of the chamber.

6. A filter as recited in claim 1 wherein said tuning means selects a radio frequency, ω, for said a.c. voltage component ($\nabla\Phi_1$)) according to values of α and β wherein:

$$\alpha=[\Omega^2/4-\lambda_0]/\omega^2$$

$$\beta=\lambda_1/[4\omega^2]$$

and $$\lambda=2eV(t)/ma^2$$

with $\lambda=\lambda_0+\lambda_1 \cos \omega t$, where "e" is the elementary charge, V(t) is the applied voltage, $\Phi_0+\Phi_1$, as a function of time, "a" is the distance between the axis and the wall of the chamber and Ω is the cyclotron frequency of the ions $m_1$.

7. A device for selectively establishing predetermined orbits for ions of a first mass/charge ratio ($m_1$) relative to an axis, which comprises:

a means for crossing an electric field (E) with a substantially uniform magnetic field (B), wherein said magnetic field is oriented along said axis and said electric field is oriented in a substantially radial direction relative to said axis, and further wherein said electric field has a d.c. voltage component ($\nabla\Phi_0$) and an a.c. voltage component ($\nabla\Phi_1$) ($E=\nabla(\Phi_0+\Phi_1)$);

a means for introducing the ions $m_1$ into said crossed magnetic and electric fields;

a means for fixing said d.c. voltage component ($\nabla\Phi_0$) to place said ions $m_1$ in confined orbits around said axis when said a.c. voltage component ($\nabla\Phi_1$) is substantially zero; and a means for selectively tuning said a.c. voltage component ($\nabla\Phi_1$) to establish unconfined orbits for ejection of the ions $m_1$ away from said axis when said a.c. voltage component ($\nabla\Phi_1$) has a predetermined value.

8. A device as recited in claim 7 wherein said crossed electric and magnetic fields are established in a hollow, substantially cylindrical-shaped chamber, with said chamber defining said axis and being surrounded by a wall.

9. A device as recited in claim 8 wherein the ions $m_1$ pass through said chamber when on confined orbits, and are ejected into said wall of said chamber when on unconfined orbits.

10. A device as recited in claim 8 wherein a cut off mass, $M_c$, is greater than $m_1$ and is determined by the expression:

$$M_c=zea^2(B)^2/8V_{ctr}$$

where "e" is the elementary charge, "z" is the charge number, "a" is the distance between the axis and the wall of the chamber, and voltage has a positive value ($V_{ctr}$) along the axis, which decreases to zero at the wall of the chamber.

11. A device as recited in claim 7 wherein the ions $m_1$ are included in a multi-species plasma with ions of a second mass/charge ratio ($m_2$).

12. A device as recited in claim 7 wherein the first mass/charge ratio ($m_1$) is greater than the second mass/charge ratio ($m_2$), and wherein said d.c. voltage component ($\nabla\Phi_0$) places the ions $m_1$ and the ions $m_2$ in confined orbits around said axis when said a.c. voltage component ($\nabla\Phi_1$) is substantially zero and maintains said ions $m_2$ on confined orbits when said a.c. voltage component ($\nabla\Phi_1$) is tuned to said predetermined value.

13. A device as recited in claim 7 wherein the first mass/charge ratio ($m_1$) is less than the second mass/charge ratio ($m_2$), and wherein said d.c. voltage component ($\nabla\Phi_0$) places the ions $m_1$ and the ions $m_2$ in confined orbits around said axis when said a.c. voltage component ($\nabla\Phi_1$) is substantially zero and maintains said ions $m_2$ on confined orbits when said a.c. voltage component ($\nabla\Phi_1$) is tuned to said predetermined value.

14. A device as recited in claim 7 wherein said tuning means selects a radio frequency, ω, for said a.c. voltage component ($\nabla\Phi_1$) according to values of α and β wherein:

$$\alpha=[\Omega^2/4-\lambda_0]/\omega^2$$

$$\beta=\lambda_1/[4\omega]$$

and $$\lambda=2eV(t)/ma^2$$

with $\lambda=\lambda_0+\lambda_1 \cos \omega t$, where "e" is the elementary charge, V(t) is the applied voltage, $\Phi_0+\Phi_1$ as a function of time, "a" is the distance between the axis and the wall of the chamber and Ω is the cyclotron frequency of the ions $m_1$.

15. A method for selectively establishing predetermined orbits for ions of a first mass/charge ratio ($m_1$) relative to an axis, which comprises the steps of:

crossing an electric field (E) with a substantially uniform magnetic field (B), wherein said magnetic field is oriented along said axis and said electric field is oriented in a substantially radial direction relative to said axis, and further wherein said electric field has a d.c. voltage component ($\nabla\Phi_0$) and an a.c. voltage component ($\nabla\Phi_1$) ($E=\nabla(\Phi_0+\Phi_1)$);

introducing the ions $m_1$ into said crossed magnetic and electric fields;

fixing said d.c. voltage component ($\nabla\Phi_0$) to place said ions $m_1$ in confined orbits around said axis when said a.c. voltage component ($\nabla\Phi_1$) is substantially zero; and selectively tuning said a.c. voltage component ($\nabla\Phi_1$) to establish unconfined orbits for ejection of the ions $m_1$ away from said axis when said a.c. voltage component ($\nabla\Phi_1$) has a predetermined value.

16. A method as recited in claim 15 wherein the ions $m_1$ are included in a multi-species plasma with ions of a second mass/charge ratio ($m_2$), wherein the first mass/charge ratio ($m_1$) is greater than the second mass/charge ratio ($m_2$), and wherein said d.c. voltage component ($\nabla\Phi_0$) places the ions $m_1$ and the ions $m_2$ in confined orbits around said axis when said a.c. voltage component ($\nabla\Phi_1$) is substantially zero and maintains said ions $m_2$ on confined orbits when said a.c. voltage component ($\nabla\Phi_1$) is tuned to said predetermined value.

17. A method as recited in claim 15 wherein the ions $m_1$ are included in a multi-species plasma with ions of a second mass/charge ratio ($m_2$), wherein the first mass/charge ratio ($m_1$) is less than the second mass/charge ratio ($m_2$), and wherein said d.c. voltage component ($\nabla\Phi_0$) places the ions $m_1$ and the ions $m_2$ in confined orbits around said axis when said a.c. voltage component ($\nabla\Phi_1$) is substantially zero and maintains said ions $m_2$ on confined orbits when said a.c. voltage component ($\nabla\Phi_1$) is tuned to said predetermined value.

18. A method as recited in claim 15 wherein said tuning step includes the steps of:

determining a cyclotron frequency for the ions $m_1$; and selecting a radio frequency, ω, for said a.c. voltage component ($\nabla\Phi_1$) according to values of α and β wherein:

$$\alpha=[\Omega^2/4-\lambda_0]/\omega^2$$

$$\beta=\lambda_1/[4\omega^2]$$

and $$\lambda=2eV(t)/ma^2$$

with $\lambda=\lambda_0+\lambda_1 \cos \omega t$, where "e" is the elementary charge, V(t) is the applied voltage, $\Phi_0+\Phi_1$ as a function of time, "a" is the distance between the axis and the wall of the chamber and Ω is the cyclotron frequency of the ions $m_1$.

19. A method as recited in claim 15 wherein said crossed electric and magnetic fields are established in a hollow, substantially cylindrical-shaped chamber, with said chamber defining said axis and being surrounded by a wall.

20. A method as recited in claim 19 wherein the ions $m_1$ pass through said chamber when on confined orbits, and are ejected into said wall of said chamber when on unconfined orbits.

* * * * *

UNITED STATES PATENT AND TRADEMARK OFFICE

CERTIFICATE OF CORRECTION

PATENT NO. : 6,719,909 B2
DATED : April 13, 2004
INVENTOR(S) : Tihiro Ohkawa

It is certified that error appears in the above-identified patent and that said Letters Patent is hereby corrected as shown below:

Column 5,
Line 55, delete "$(m>M^c)$" insert -- $(m>M_c)$ --

Column 7,
Line 6, delete "$(\nabla\Phi_1))$" insert -- $(\nabla\Phi_1)$ --

Signed and Sealed this

Twenty-fifth Day of May, 2004

JON W. DUDAS
*Acting Director of the United States Patent and Trademark Office*